Sept. 2, 1941.  G. E. NERNEY  2,254,750

HANDLEBAR CONSTRUCTION

Filed Dec. 9, 1939

INVENTOR
George E. Nerney
BY
Blair, Curtis, Dunne & Hayward
ATTORNEYS

Patented Sept. 2, 1941

2,254,750

UNITED STATES PATENT OFFICE 2,254,750

HANDLEBAR CONSTRUCTION

George E. Nerney, Attleboro, Mass.

Application December 9, 1939, Serial No. 308,333

4 Claims. (Cl. 74—551.2)

This invention relates to a handlebar construction for cycles.

One of the objects of this invention is to provide a handlebar construction which will be simple, practical and durable. Another object is to provide a construction of the above character which may be manufactured from inexpensive materials and at low labor cost. Another object is to provide a construction of the above character which will present a pleasing and attractive appearance. Another object is to provide a construction of the above character which will further the comfort of a cycle rider by absorbing shocks incident to the travel of the wheels over rough surfaces. Other objects will be in part obvious and in part pointed out hereinafter.

The invention, accordingly, consists in the features of construction, combinations of elements, and arrangements of parts as will be exemplified in the structure to be hereinafter described, and the scope of the application of which will be indicated in the following claims.

Figure 1:
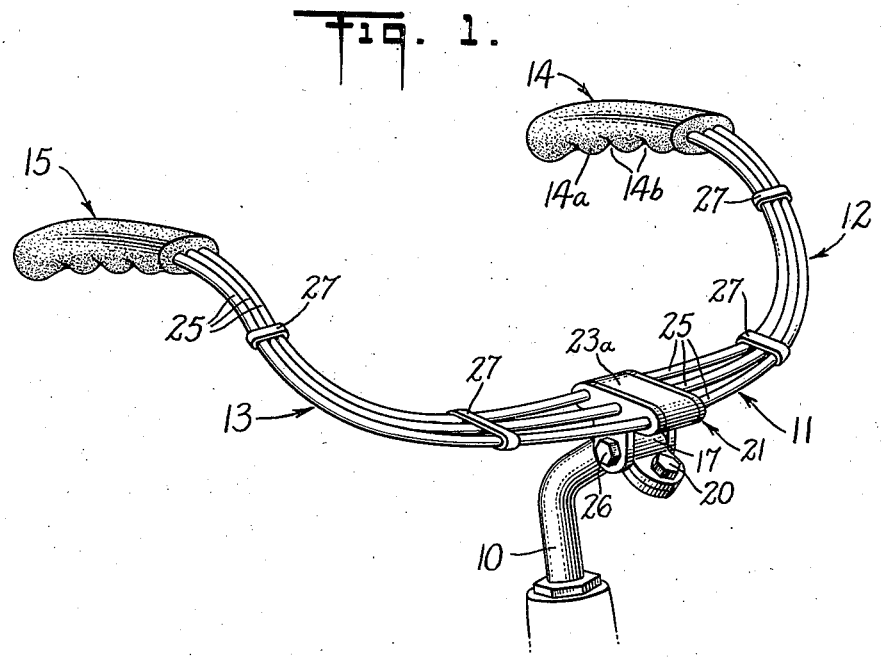
Figure 2:
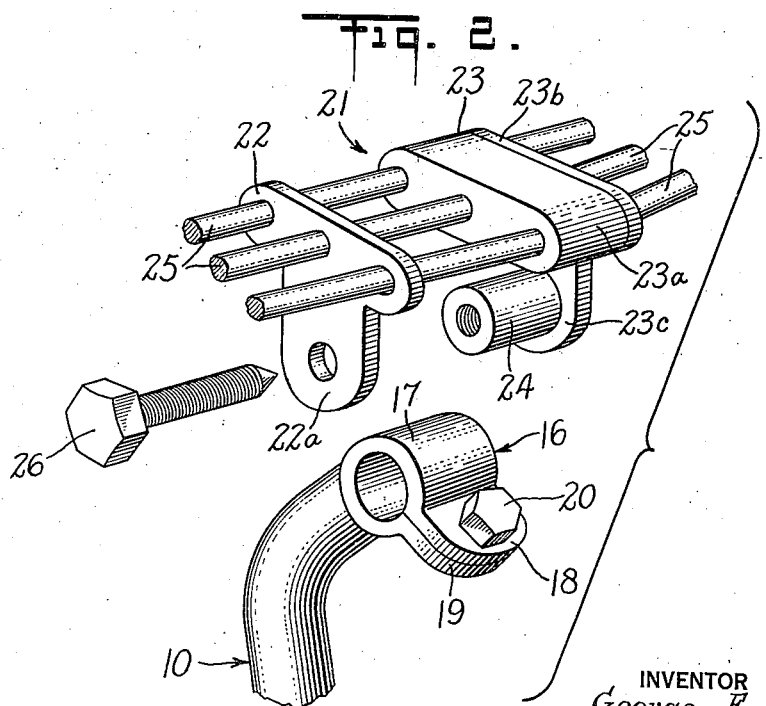

In the accompanying drawing in which is shown one of the various possible embodiments of the above invention, Figure 1 is a perspective view of my handlebar construction as mounted on a steering post of a cycle or the like;

Figure 2 is an enlarged exploded perspective view of certain of the connecting parts of my handlebar construction.

Similar reference characters refer to similar parts throughout the several views of the drawing.

As conducive to a clearer understanding of certain important features of this invention, it might here be pointed out that handlebars commonly used on cycles in the past have been rigid and consequently transmitted all shocks from the front wheels of cycles to the arms of the rider. Furthermore, this rigid construction of such handlebars is not conducive to ease in pulling or pushing when the rider is working hard to go up hill or stopping abruptly. Further still, the usual handlebar construction, made as a rule from hollow pipe or the like, presents an unsightly appearance. One of the objects of this invention is to provide a handlebar construction which will overcome the above difficulties as well as many others.

Referring to Figure 1, there is shown a steering post 10, preferably connected in the usual manner to the front wheel of the cycle (not shown). Thus, movement of the steering post 10 about its vertical axis, moves the front wheel of the cycle for steering and purposes of balance. As will be explained in greater detail hereinafter, I have provided a handlebar generally indicated at 11 having a pair of arms generally indicated at 12 and 13, extending outwardly and rearwardly from the post and terminating in handle portions generally indicated at 14 and 15.

Turning now to Figure 2, the upper end of post 10 has formed thereon a split sleeve, or eye generally indicated at 16, split sleeve 16 including a cylindrical portion 17 with a pair of extensions 18 and 19, through which is threaded a screw bolt 20. Thus, as will be explained more fully hereinafter, insertion of a boss or the like in the split sleeve and subsequent tightening of the screw 20 will secure a structure such as the handlebar shown on post 10.

Still referring to Figure 2, I have provided a split yoke generally indicated at 21 comprising sections 22 and 23. Section 23 includes a block 23a secured in any suitable manner to a plate 23b having an extension 23c extending downwardly therefrom; a boss 24 is secured to and extends from extension 23c.

Arms 12 and 13 each comprise a plurality of resilient strands 25 the size, character and construction of which will be described hereinafter. Strands 25 are fixedly connected to block 23a of section 23. Preferably these strands 25 are single pieces thus extending through the block 23a and the section 23 and shaped to form two arms 12 and 13 of the handlebar.

Section 22 of the yoke 21 is slidably mounted upon strands 25 of arm 13 and has an extension 22a complementary with section 23. Extensions 22a and 23c, as well as boss 24 have aligned holes formed therein suitably threaded to receive a fastening bolt 26.

Accordingly, in order to secure the handlebar to the steering post 10, section 22 is moved along strands 25 on arm 13 to provide sufficient space after which the boss 24 is inserted in the slit split sleeve 16. Section 22 is then brought up flush against the block 23a and the bolt 26 is threaded into position to secure the parts as shown in Figure 1. Tightening of bolt 20 as described above, completes the fastening operation, and it will be understood that the arms may be adjusted to any desired vertical position by loosening the bolt 20 and moving the handlebars about the horizontal axis.

It will be understood that the arms 12 and 13 and more particularly the strands 25 may take any desired shape although they should preferably extend outwardly, upwardly and rearwardly as shown in Figure 1, this being the usual general shape of a handlebar on a cycle. The strands 25 are of such dimension and made of such resilient material, that they will have a certain amount of spring for purposes to be described hereinafter. Strands 25 are also interconnected at spaced points therealong by straps 27 fixedly secured thereto. As best seen in Figure 1, the strands 25 are secured in block 23a in a generally horizontal position on a flat plane and are also held in this position by the straps 27. Thus the resiliency of the strands makes the arms generally resilient in vertical directions with respect to the cycle.

The construction of handle grips 14 and 15 is identical and may be made of any plastic or rubber material; preferably the grips have smooth rounded upper and side portions. The grips may be oval shaped in cross section thus to afford a larger and more comfortable gripping surface for the rider. The undersurface 14a of grip 14 is provided with a series of grooves 14b suitably spaced therealong for convenient gripping with the fingers.

It will be understood that the majority of shocks imparted to the handlebar through the front wheel by way of post 10 are in generally vertical directions with respect to the cycle. As noted above, the arms 12 and 13 are resilient in such directions. Consequently, such shocks are largely absorbed by the arms and are not imparted to the riders. Furthermore, a natural tendency of the rider is to pull up on the bars when pressing hard on the pedals of the cycle and the resiliency of the arms 12 and 13 facilitates such work. Likewise, the resiliency of the arms 12 and 13 is a convenience when coming to a quick stop.

It will thus be seen that I have provided an entirely practical and efficient construction in which the several objects hereinbefore referred to have been successfully and efficiently carried out.

As many possible embodiments may be made of the above invention, and as many changes may be made in the embodiment above set forth, it is to be understood that all matter hereinabove set forth, or shown in the accompanying drawing, is to be interpreted as illustrative and not in a limiting sense.

1. In handlebar construction, in combination, a cycle steering post, a split sleeve formed in the end of said post, a yoke construction, and a pair of arms connected to said yoke and extending outwardly and rearwardly therefrom, said yoke construction comprising a plate member fixedly secured to one arm and having an extension with a lug formed thereon to fit within said split sleeve, and a complementary plate slidably fitted over the other of said arms and having a complementary extension opposite said last-mentioned extension, said extensions and said lug having holes formed therein for the insertion of a fastening bolt.

2. In handlebar construction, the combination of a cycle steering post and handlebars comprising a pair of arms extending outwardly and rearwardly of said post, each of said arms comprising a plurality of resilient spaced strands the axes of which collectively define a ruled surface, a portion of the length of each strand being substantially parallel to the ground, and means for maintaining said strands in said relationship whereby the handlebar construction is substantially vertically resilient and substantially horizontally rigid.

3. In handlebar construction, the combination of a cycle steering post and handlebars comprising a pair of arms extending upwardly, outwardly and rearwardly of said post, each of said arms comprising a plurality of resilient spaced strands the axes of which collectively define a ruled surface, a portion of the length of each strand being substantially parallel to the ground, and means for maintaining said strands in said relationship whereby the handlebar construction is substantially vertically resilient and substantially horizontally rigid.

4. In handlebar construction, the combination of a cycle steering post and handlebars comprising a pair of arms extending outwardly and rearwardly of said post, each of said arms comprising a plurality of resilient spaced strands the axes of which collectively define a ruled surface, a portion of the length of each strand being substantially parallel to the ground, and a plurality of crossbows secured to said strands at spaced points to maintain said strands in said relationship whereby the handlebar construction is substantially vertically resilient and substantially horizontally rigid.

GEORGE E. NERNEY.